United States Patent
Suzuki et al.

(10) Patent No.: US 6,333,612 B1
(45) Date of Patent: Dec. 25, 2001

(54) MOTOR CONTROL APPARATUS FOR HYBRID VEHICLE

(75) Inventors: Minoru Suzuki; Shinobu Ochiai; Shinji Yoshikawa; Kazuhiro Hara, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/676,500

(22) Filed: Oct. 2, 2000

(30) Foreign Application Priority Data

Oct. 4, 1999 (JP) .................................................. 11-283579

(51) Int. Cl.⁷ ...................................................... H02P 7/00
(52) U.S. Cl. ......................... 318/432; 318/139; 180/65.2; 180/165
(58) Field of Search ..................................... 318/432, 139, 318/459, 366, 367, 368; 180/65.2, 65.3, 65.5, 165

(56) References Cited

U.S. PATENT DOCUMENTS

| | | | |
|---|---|---|---|
| 5,081,365 | * | 1/1992 | Field et al. .............................. 290/45 |
| 5,550,445 | * | 8/1996 | Nii ....................................... 318/153 |
| 5,614,809 | * | 3/1997 | Kiuchi et al. ........................... 322/11 |
| 5,785,138 | * | 7/1998 | Yoshida ............................... 180/65.2 |
| 5,893,895 | * | 4/1999 | Ibaraki ................................... 701/57 |
| 5,898,282 | * | 4/1999 | Drozdz et al. ......................... 318/138 |
| 6,216,465 | * | 4/2001 | Wakashiro et al. ...................... 60/706 |

* cited by examiner

Primary Examiner—Robert E. Nappi
Assistant Examiner—Rina I. Duda
(74) Attorney, Agent, or Firm—Arent Fox Kintner Plotkin & Kahn, PLLC (57) ABSTRACT

The motor control apparatus of the present invention is provided for a hybrid vehicle with a combustion engine for outputting a driving force, an electric motor for generating a force for assisting the output from the engine, a power storage unit for supplying electric power to the motor and for storing electric energy regenerated by the motor, and electrical equipment which is operated by electric power. The motor control apparatus comprises: a first electric power measuring device for measuring the electric power supplied from or stored in the power storage unit; a second electric power measuring device for measuring the electric power supplied to or drawn from the motor; a drive mode determining device for determining the drive mode, based on a predetermined parameter; a measured electric power selector for selecting one of the value measured by the first electric power measuring device and the value measured by the second electric power measuring device, depending on the determination by the drive mode determining device; and a motor controller for controlling the electric power which is to be supplied to or is to be drawn from the motor, depending on the measured value selected by the measured electric power selector.

7 Claims, 7 Drawing Sheets

| GAIN \ MODE | DECELERATION | ASSISTANCE | CRUISE | IDLING |
|---|---|---|---|---|
| Kp | Kp1 | Kp2 | Kp3 | Kp4 |
| Ki | Ki1 | Ki2 | Ki3 | Ki4 |

HIGH — MEDIUM — LOW

GAIN 1  GAIN 2  GAIN 3  GAIN 4

MOTOR CONTROL APPARATUS FOR HYBRID VEHICLE

BACKGROUND OF THE INVENTION

1. Field of the Invention

The present invention relates to a motor control apparatus for a hybrid vehicle which carries a combustion engine and a motor.

This application is based on Japanese Patent Application No. 11-283579, the contents of which are incorporated herein by reference.

2. Description of the Related Art

To improve the driveability of a vehicle, a control apparatus, which can respond without delay to instructions from a driver to accelerate or decelerate the vehicle, is required. A hybrid vehicle which has a combustion engine and a motor must control without delay the amount of electric energy which is supplied to the motor, or which is drawn from the motor. The hybrid vehicle supplies the electric energy to the motor, and the motor assists the engine to accelerate the vehicle. Further, the hybrid vehicle uses the motor as a generator, and the generated electric energy is drawn so that the vehicle decelerates.

To achieve the control without delay, the gain supplied from the control apparatus to the motor may be increased, and, alternatively, the rate of change of electric energy per unit time drawn from the motor may be increased, and the rate of change of the motor torque per unit time may be increased.

To achieve the above-mentioned control, a structure for drawing and supplying the electric energy to the motor must be provided, and the structure may unbalance the energy management when the engine is idling, or when the vehicle is cruising at a constant speed. When the engine is idling, or when the vehicle is cruising, the motor acts as a generator to send the generated energy to the battery, and the battery is charged. The amount of electric energy stored in the battery cannot be accurately known only by detecting the electric energy which is supplied to or sent from the motor. The reason for this is that the battery is not only connected to the motor but also connected to various other electrical equipment which consumes electric energy, and that the electric energy supplied to and sent from the motor is not necessarily the same as that supplied to and sent from the battery.

To solve this problem, the electric energy supplied to and sent from the battery may be detected. However, according to the structure for detecting the electric energy and for controlling the detected value to maintain it at a fixed value, when the motor generates electric energy while the vehicle is idling or cruising, the motor generates the electric energy to be consumed by the electrical equipment such as the air conditioner, head lights, and defroster, and the electric energy to be supplied to the battery. Therefore, variations in the electric energy consumed by the electrical equipment appears as a variation in electric energy generated by the motor.

According to this structure, when electrical equipment is turned on or off while the engine is idling, the electric energy generated by the motor varies, the load on the engine also varies, and the engine may therefore stall.

Further, when electrical equipment is turned on or off while the vehicle is cruising, the electric energy generated by the motor varies, the load on the engine also varies, and the vehicle may behaves unstably.

BRIEF SUMMARY OF THE INVENTION

It is therefore a first object of the present invention to provide a motor control apparatus for a hybrid vehicle which can respond to instructions of the driver to accelerate or decelerate the vehicle while balancing the energy management when the engine is idling or when the vehicle is cruising.

It is a second object of the present invention to provide a motor control apparatus for a hybrid vehicle which can prevent the engine from stalling even when electrical equipment is turned on or off while the engine is idling, and which can prevent the unstable behavior of the vehicle even when the electrical equipment is turned on or off while the vehicle is cruising.

It is therefore a third object of the present invention to provide a motor control apparatus for a hybrid vehicle which can respond to an instruction of a driver to accelerate or decelerate the vehicle while balancing the energy management when the engine is idling or when the vehicle is cruising, which can prevent the engine from stalling even when electrical equipment is turned on or off while the engine is idling, and which can prevent the unstable behavior of the vehicle even when the electrical equipment is turned on or off while the vehicle is cruising.

In a first aspect of the present invention, a motor control apparatus for a hybrid vehicle is provided with a combustion engine (10) for outputting driving force, an electric motor (2) for generating a force for assisting the output from the engine, a power storage unit (the main battery 1) for supplying electric power to the motor and for storing electric energy regenerated by the motor, and an electrical equipment (5) which is operated by the electric power. The motor control apparatus comprises: a first electric power measuring device (6) for measuring the electric power supplied from or stored in the power storage unit; a second electric power measuring device (7) for measuring the electric power supplied to or drawn from the motor; a drive mode determining device (11) for determining the drive mode, based on a predetermined parameter; a measured electric power selector (16) for selecting one of the value measured by the first electric power measuring device and the value measured by the second electric power measuring device, depending on the determination by the drive mode determining device; and a motor controller (the feedback processor 15, and the power drive unit 3) for controlling the electric power which is to be supplied to or is to be drawn from the motor, depending on the measured value selected by the measured electric power selector.

According the first aspect of the present invention, the measured electric power selector selects one of the value measured by the first electric power measuring device and the value measured by the second electric power measuring device, depending on the drive mode determined by the drive mode determining device. Namely, the measured electric power selector selects one of the electric power supplied from or stored in the battery and the electric power supplied to or drawn from the motor. Therefore, the motor control apparatus is responsive to a driver's instruction to accelerate or decelerate the vehicle in the assistance mode or in the deceleration mode, while balancing the energy management when the vehicle is idling or cruising.

In a second aspect of the present invention, the motor control apparatus comprises: an electric power measuring device (the first electric power measuring device 6, and the second electric power measuring device 7) for measuring the electric power transferred between the power storage unit and the motor; a motor controller (the feedback processor 15, and the power drive unit 3) for controlling the electric power which is to be supplied to the motor or which is to be drawn from the motor, depending on the value measured by the electric power measuring device; a drive mode determining device (11) for determining the drive mode, based on a predetermined parameter;, and a gain switcher (14) for switching a gain which defines a rate of change of the torque of the motor, depending on the determination by the drive mode determining device. The motor controller controls the electric power which is to be supplied to or is to be drawn from the motor, depending on the rate of change defined by the gain switched by the gain switcher.

According the second aspect of the present invention, the gain switcher switches a gain which defines a rate of change in torque of the motor, depending on the determination by the drive mode determining device. Therefore, the motor control apparatus is responsive to driver's instructions to accelerate or decelerate the vehicle in the assistance mode or in the deceleration mode, while preventing the engine from stalling in the idling mode when electrical equipment is turned on or off, and while preventing the unstable behavior of the vehicle in the cruise mode when electrical equipment is turned on or off.

In a third aspect of the present invention, the motor control apparatus comprises: a first electric power measuring device for measuring the electric power supplied from or stored in the power storage unit; a second electric power measuring device for measuring the electric power supplied to or drawn from the motor; a drive mode determining device for determining the drive mode, based on a predetermined parameter; a measured electric power selector for selecting one of the value measured by the first electric power measuring device and the value measured by the second electric power measuring device, depending on the determination by the drive mode determining device; a motor controller for controlling the electric power supplied to or drawn from the motor, depending on the measured value selected by the measured electric power selector; and a gain switcher for switching a gain which defines a rate of change in the torque of the motor, depending on the determination by the drive mode determining device. The motor controller controls the electric power which is to be supplied to or is to be drawn from the motor, depending on the rate of change defined by the gain switched by the gain switcher.

According the third aspect of the present invention, the measured electric power selector selects one of the value measured by the first electric power measuring device and the value measured by the second electric power measuring device, depending on the drive mode determined by the drive mode determining device. The gain switcher switches a gain which defines a rate of change in the torque of the motor, depending on the determination by the drive mode determining device. Therefore, the motor control apparatus is responsive to a driver's instruction to accelerate or decelerate the vehicle in the assistance mode or in the deceleration mode, while balancing the energy management when the vehicle is idling or cruising, while preventing the engine from stalling in the idling mode when the electrical equipment is turned on or off, and while preventing the unstable behavior of the vehicle in the cruise mode when the electrical equipment is turned on or off.

In a fourth aspect of the present invention, the drive mode determining device determines one of the assistance mode for accelerating the vehicle, the deceleration mode for decelerating the vehicle, the cruise mode for driving the vehicle at a constant speed, and the idling mode for idling the vehicle. The measured electric power selector selects the value measured by the first electric power measuring device when in the cruise mode or the idling mode, and selects the value measured by the second electric power measuring device when in the assistance mode or the deceleration mode.

According to the fourth aspect of the present invention, when in the cruise mode or the idling mode, the value measured by the first electric power measuring device is selected, the electric power stored in the battery is measured, and the control is performed based on the selected value, thereby balancing the energy management.

When in the assistance mode or the deceleration mode, the value measured by the second electric power measuring device is selected, the electric power supplied to or drawn from the motor is measured, and the control is performed based on the selected value, thereby making the vehicle responsive to the driver's instructions to accelerate or decelerate the vehicle.

In a fifth aspect of the present invention, the drive mode determining device determines one of the assistance mode for accelerating the vehicle, the deceleration mode for decelerating the vehicle, the cruise mode for driving the vehicle at a constant speed, and the idling mode for idling the vehicle. The gain switched by the gain switcher in the cruise mode or the idling mode is smaller than the gain in the assistance mode or the deceleration mode.

According to the fifth aspect of the present invention, the gain switched by the gain switcher in the cruise mode or the idling mode is smaller than the gain in the assistance mode or the deceleration mode. Therefore, when in the cruise mode or the idling mode, even when the electrical equipment is turned on or off, the rate of change in the motor torque which is defined by the gain is low, and the variation in the load on the engine is also low. Accordingly, when in the idling mode, the engine can be prevented from stalling, and when in the cruise mode, unstable behavior of the vehicle can be prevented.

When in the assistance mode or the deceleration mode, because the rate of change in the motor torque defined by the gain is high, the vehicle can be responsive to the driver's instructions to accelerate or decelerate the vehicle.

DETAILED DESCRIPTION OF THE INVENTION

Figure 1:
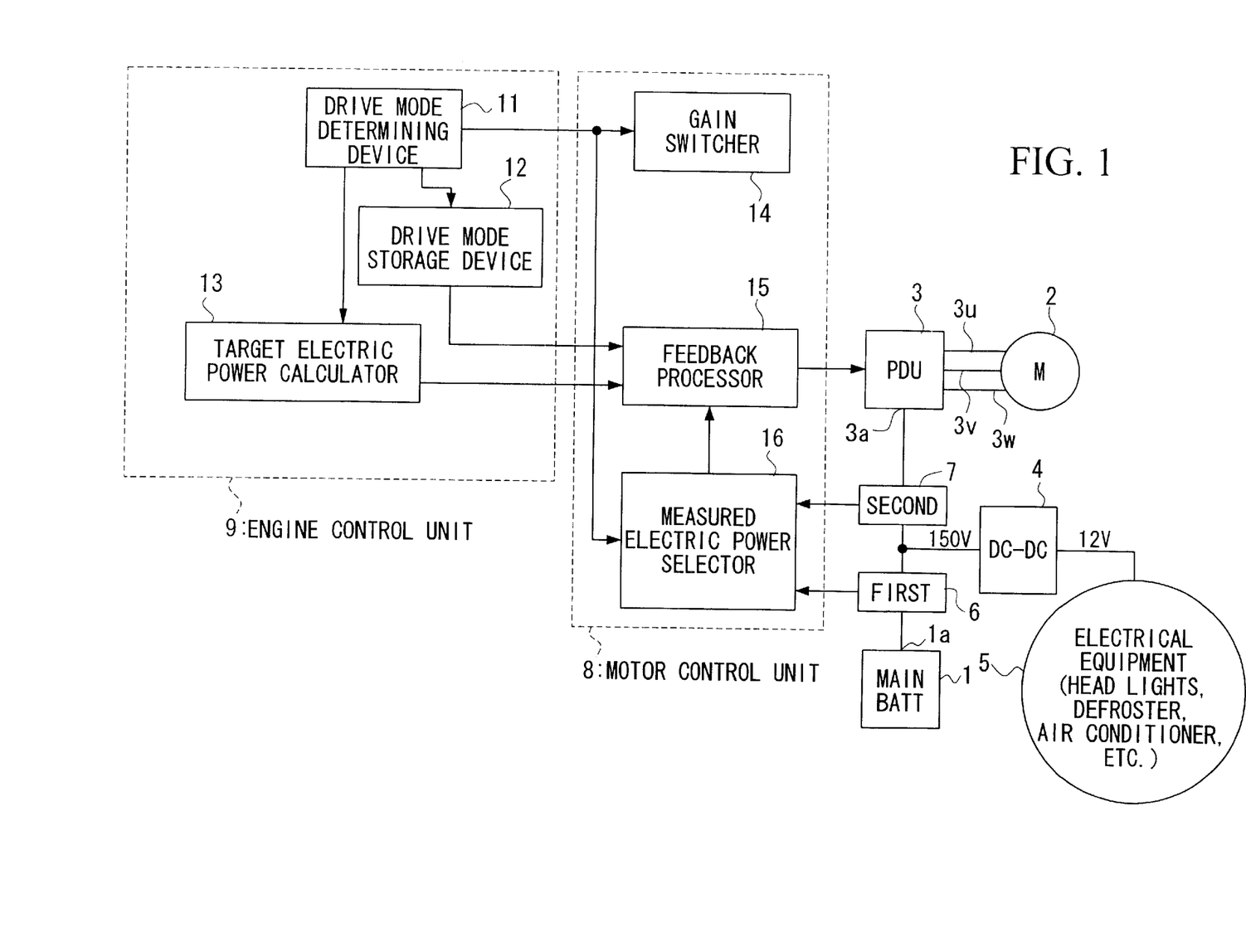
FIG. 1 is a block diagram showing the motor control apparatus for the hybrid vehicle of the present invention.

The embodiment of the motor control apparatus for the hybrid vehicle of the present invention will be explained with reference to the figures. FIG. 1 is a block diagram showing the principal structure of the motor control apparatus for the hybrid vehicle of the present invention. In this figure, 1 denotes a main battery whose terminal 1a outputs a voltage of 150V. Numeral 2 denotes a motor, which is driven by electric energy supplied from the main battery 1, for driving the vehicle, or for assisting the engine. A power drive unit 3 for controlling the amount of electric energy to be supplied to the motor 2 is provided between the main battery 1 and the motor 2.

The terminal 1a of the main battery 1 is connected via a DC-DC converter 4 for converting a voltage, to various pieces of electrical equipment 5 such as headlights, a defroster, and an air conditioner. Since the electrical equipment 5 operates on 12V, the DC-DC converter 4 converts the voltage of 150V output from the main battery 1 into 12V.

A first electric power measuring device 6 is provided on a line connecting the terminal 1a of the main battery 1 with the terminal 3a of the power drive unit 3 and in proximity to the terminal 1a of the main battery 1. The first electric power measuring device 6 measures the electric power drawn from the main battery 1, or supplied to the main battery 1. The first electric power measuring device 6 comprises an electric current sensor, and a voltage sensor which are described below.

A second electric power measuring device 7 is provided on the line connecting the terminal 1a of the main battery 1 with the terminal 3a of the power drive unit 3 and in proximity to the terminal 3a of the power drive unit 3. The second electric power measuring device 7 measures the electric power which is sent via the power drive unit 3 to the motor 2, or which is sent from the motor 2 and is drawn from the terminal 3a via the power drive unit 3. The second electric power measuring device 7 comprises an electric current sensor, and a voltage sensor.

The outputs from the first and second electric power measuring devices 6 and 7 are input to a motor control unit 8 which is described below.

Numeral 9 denotes an engine control unit for controlling the combustion engine 10 which is described below. Schematically, the engine control unit 9 comprises a CPU (Central Processing Unit), and a memory. The engine control unit 9 comprises a drive mode determining device 11, a drive mode storage device 12 for storing the drive mode determined by the determining device 11, and a target electric power calculator 13 for calculating a target electric power, based on the drive mode determined by the drive mode determining device 11. The target electric power calculated by the target electric power calculator 13 is a target electric power for controlling the electric power which is drawn from the main battery 1 or is supplied to the main battery 1, and the electric power which is sent to the motor 2, or is drawn from the motor 2.

The output from the drive mode determining device 11 is input to the drive mode storage device 12 and the target electric power calculator 13. Further, the output from the drive mode determining device 11 is externally output from the engine control unit 9. Further, the outputs from the drive mode storage device 12 and the target electric power calculator 13 are externally output from the engine control unit 9.

The drive mode determining device 11 determines the present drive mode, based on a predetermined parameter. The drive mode determining device 11 repeats the determinations at a predetermined interval. The results of the repeated determinations are sent to the drive mode storage device 12, which then stores the previous result of the determination, that is, the previous drive mode.

Numeral 8 denotes a motor control unit for controlling the motor 2. Schematically, the motor control unit 8 comprises a CPU (Central Processing Unit), and a memory. The motor control unit 8 includes a gain switcher 14 for switching a gain (which defines a rate of change in the motor torque), depending on the drive mode, a feedback processor 15 for controlling the motor 2 according to the gain switched by the gain switcher 14, and a measured electric power selector 16 for selecting the measured electric power values.

The motor control unit 8 receives as inputs three outputs from the engine control unit 9. The gain switcher 14 receives as an input the output from the drive mode determining device 11. The feedback processor 15 receives as inputs the outputs from the drive mode storage device 12 and the target electric power calculator 13. The measured electric power selector 16 receives as an input the output from the drive mode determining device 11.

The output from the gain switcher 14 is input to the feedback processor 15. The output from the feedback processor 15 is externally output from the motor control unit 8. The measured electric power selector 16 receives as inputs the outputs from the first electric power measuring device 6 and the second electric power measuring device 7. The output from the measured electric power selector 16 is input to the feedback processor 15.

The gain switcher 14 switches the gain of the feedback system for controlling the motor 2, based on the information regarding the drive mode of the vehicle sent from the drive mode determining device 11, and sends the information regarding the switched gain to the feedback processor 15. The feedback processor 15 controls the power drive unit 3, depending on the information regarding the gain sent from the gain switcher 14. The power drive unit 3 controls the electric power which is to sent to the motor 2 or is to be drawn from the motor 2. The measured electric power selector 16 selects one of the outputs from the first electric power measuring device 6 and the second electric power measuring device 7, based on the information regarding the drive mode of the vehicle sent from the drive mode determining device 11, and sends the selected output to the feedback processor 15.

Figure 2:
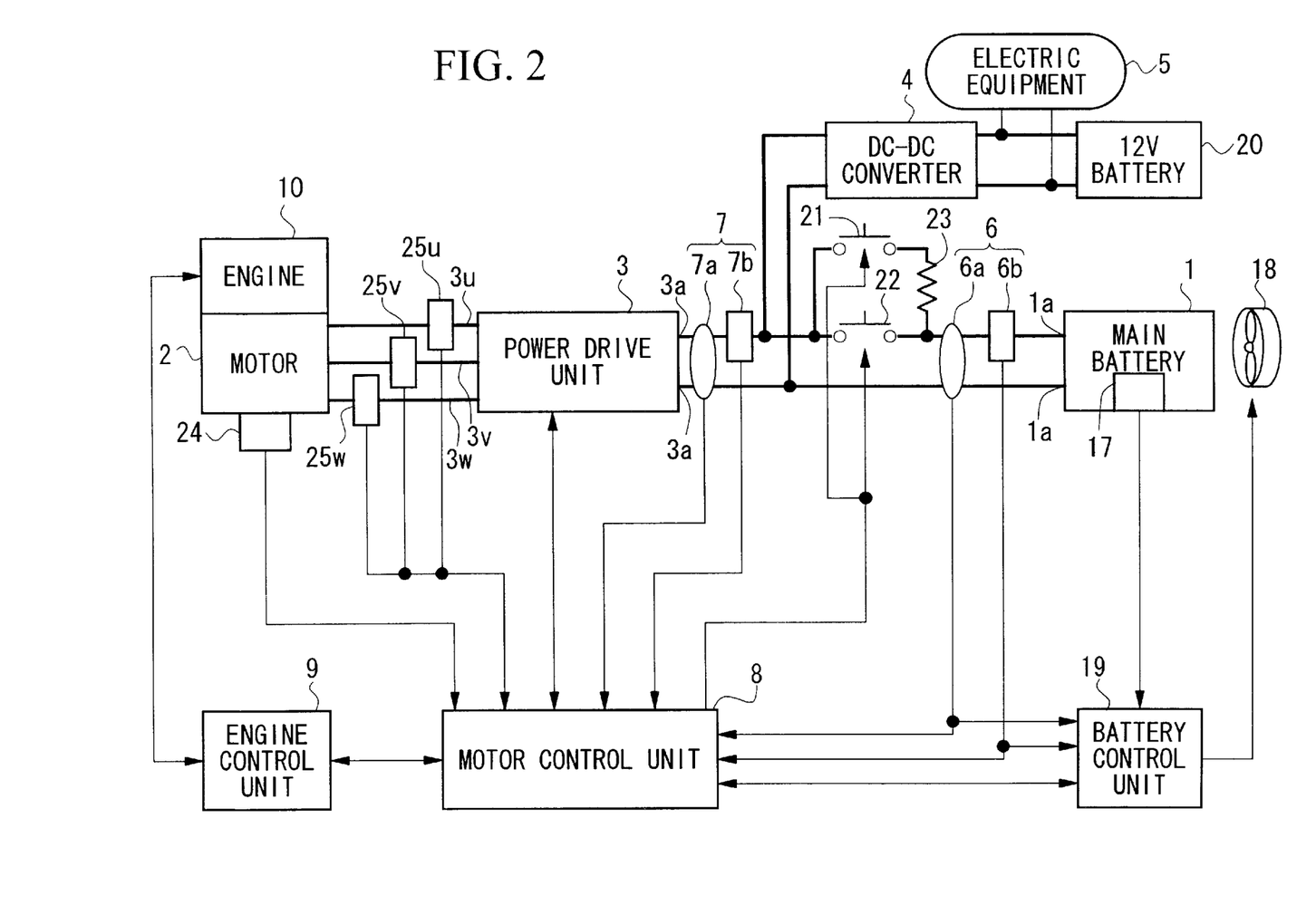
FIG. 2 a block diagram showing the control system for the parallel hybrid vehicle of the present invention.

FIG. 2 is a block diagram showing the control system for the parallel hybrid vehicle of the embodiment of the present invention. In this figure, 10 denotes a combustion engine which is driven by the combustion of fuel, and 2 denotes a motor which is driven by electric energy, and which is used together with the engine. The driving forces from the engine 10 and the motor 2 are transmitted via a transmission (not shown), which is an automatic transmission, or a manual transmission, to driving wheels (not shown). Further, when the hybrid vehicle decelerates, the rotation is transmitted from the driving wheels to the motor 2, and the motor 2 acts as a generator which converts the kinetic energy of the vehicle into the electric energy.

Numeral 1 denotes the main battery for supplying the electric power to the motor 2 when the vehicle is driven by the driving force from the motor 2, and for storing the electric energy generated by the motor 2 acting as the generator when the vehicle decelerates. In the main battery 1, a plurality of cells are serially connected, forming each module, and the modules are serially connected so as to output a high voltage (150V). Temperature sensors 17 are provided for the respective modules constituting the main battery 1. The modules are accommodated in a battery box, which has an inlet and an outlet for cooling the modules, and a cooling fan 18 at the outlet. The inlet of the battery box is positioned so that it can draw air into the vehicle, while the outlet is positioned so that it can allow the cooling fan 18 to discharge the air from the vehicle.

Numeral 9 denotes the engine control unit. The engine control unit 9 monitors the engine speed Ne, the vehicle speed, the amount AP of depression of the accelerator pedal, and the like, at a predetermined interval. The drive mode determining device 11 in the engine control unit 9 determines the drive mode of the vehicle, based on the monitored results. The drive modes are an assistance mode in which the vehicle accelerates, an deceleration mode in which the vehicle decelerates, a cruise mode in which the vehicle is cruising at a constant speed, and an idling mode in which the engine is idling while the vehicle is stopped.

The engine control unit 9 sends the information regarding the drive mode to the motor control unit 8. When the motor control unit 8 receives the information regarding drive mode from the engine control unit 9, the gain switcher 14 switches the gain, depending on the information. The feedback processor 15 controls the power drive unit 3 according to the switched gain. The power drive unit 3 controls the amount of electric power to be supplied to the motor 2 or to be drawn from the motor 2.

Numeral 19 denotes a battery control unit for calculating the remaining charge SOC (state of charge) of the main battery 1. The battery control unit 19 controls the cooling fan 18 provided for the battery box which accommodates the main battery 1 so that the temperature of the main battery 1 is maintained to be equal to or below a predetermined value, to thereby protect the main battery 1.

The engine control unit 9, the motor control unit 8, and the battery control unit 19 are provided by a CPU (Central Processing Unit), and a memory, and the functions are provided by executing computer programs for providing the functions of the control units.

Numeral 3 denotes the power drive unit in which three pairs of switching elements, in which each pair of elements are serially connected, are connected in parallel. The switching elements in the power drive unit 3 can be turned on or off by the feedback processor 15 in the motor control unit 8 so that the direct current supplied from the main battery 1 to the power drive unit 3 is converted into a three-phase alternating current, and the three-phase alternating current is supplied via three-phase lines 3u, 3v, and 3w to the motor 2.

Numeral 20 denotes a 12V battery for driving the various electrical equipment 5. The 12V battery 20 is connected via the DC-DC converter 4 to the line connecting the main battery 1 and the power drive unit 3. The DC-DC converter 4 reduces the voltage (150V) from the main battery 1 to 12V, which is then supplied to the electrical equipment 5 and the 12V battery 20.

Numeral 21 denotes a precharge contactor, and 22 denotes a main contactor. The main battery 1 and the power drive unit 3 are connected by the contactors. The precharge contactor 21 and the main contactor 22 are turned on or off by the motor control unit 8. Numeral 23 denotes a resistor for restricting a precharge electric current to the main battery 1 at the time of precharging, that is, when the precharge contactor 21 is turned on.

Numeral 24 denotes a rotation sensor for measuring the speed of rotation of the motor 2. Numerals 25u, 25v, and 25w denote electric current sensors for measuring the electric currents flowing through the three-phase lines 3u, 3v, and 3w. The values measured by the rotation sensor 24, and the electric current sensors 25u, 25v, and 25w are input into the motor control unit 8.

Numeral 6a denotes a voltage sensor provided on the line connecting the terminal 1a of the main battery 1 and the terminal 3a of the power drive unit 3, and in proximity of the terminal 1a of the main battery 1. 6b denotes an electric current sensor in proximity of the terminal 1a of the main battery 1. The voltage sensor 6a measures the voltage at the terminal 1a of the main battery 1, and the electric current sensor 6b measures the current flowing through the terminal 1a of the main battery 1. The two sensors 6a and 6b constitute a first electric power measuring device 6. The voltage value and the electric current value measured by the sensors 6a and 6b are input to both the motor control unit 8 and the battery control unit 19.

Numeral 7a denotes a voltage sensor provided on the line connecting the terminal 3a of the power drive unit 3 and the terminal 1a of the main battery 1, and in proximity of the terminal 3a of the power drive unit 3. Numeral 7b denotes an electric current sensor provided in proximity of the terminal 3a of the power drive unit 3. The voltage sensor 7a measures the voltage at the terminal 3a of the power drive unit 3, and the electric current sensor 7b measures the electric current flowing through the terminal 3a of the power drive unit 3. The two sensors 7a and 7b constitute a second electric power measuring device 7. The values of the voltage and the electric current measured by the sensors 7a and 7b are input to the motor control unit 8.

Because the DC-DC converter 4 is provided on the line connecting the terminal 1a of the battery 1 and the terminal 3a of the power drive unit 3, and between the electric current sensor 6b and the electric current sensor 7b, the electric current measured by the electric current sensor 7b is equal to the sum of the electric current measured by the electric current sensor 6b and the electric current flowing through the DC-DC converter 4.

The operation of the control system for the hybrid vehicle having the above-described structure will be briefly explained. First, the battery control unit 19 calculates the remaining charge SOC of the main battery 1, based on the electric current and the voltage at the terminal 1a of the main battery 1, and sends the calculated value to the motor control unit 8. The motor control unit 8 sends the remaining charge SOC to the engine control unit 9.

The target electric power calculator 13 in the engine control unit 9 calculates the target electric power, based on the remaining charge SOC, the amount of depression of the accelerator pedal Ap, the engine speed Ne, the vehicle speed, the air intake passage pressure Pb, the on/off state of the brake, and the like. The drive mode determining device 11 determines one of the drive modes (the assistance mode, the deceleration mode, the cruise mode, and the idling mode), depending on the engine speed Ne, the vehicle speed, and the amount of depression of the accelerator pedal Ap.

The feedback processor 15 in the motor control unit 8 calculates the electric power necessary for the motor 2, based on the target electric power. On reception of the information regarding the drive mode from the engine control unit 9, the motor control unit 8 performs the function corresponding to the specified drive mode. When in the assistance mode, or the deceleration mode, the feedback control is performed so that the electric power at the terminal 3a of the power drive unit 3, that is, the electric power measured by the second electric power measuring device 7, is set as the target electric power. When in the cruise mode, or the idling mode, the feedback control is performed so that the electric power at the terminal 1a of the main battery 1, that is, the electric power measured by the first electric power measuring device 6, is set as the target electric power. When starting the engine 10, the motor control unit 8 directs the power drive unit 3 to start the engine 1 using the motor 2.

The engine control unit 9, the motor control unit 8, the battery control unit 19 perform the above-described process at a predetermined timing so as to appropriately control the engine 10, the motor 2, and the main battery 1, and to control the hybrid vehicle.

Figure 3:
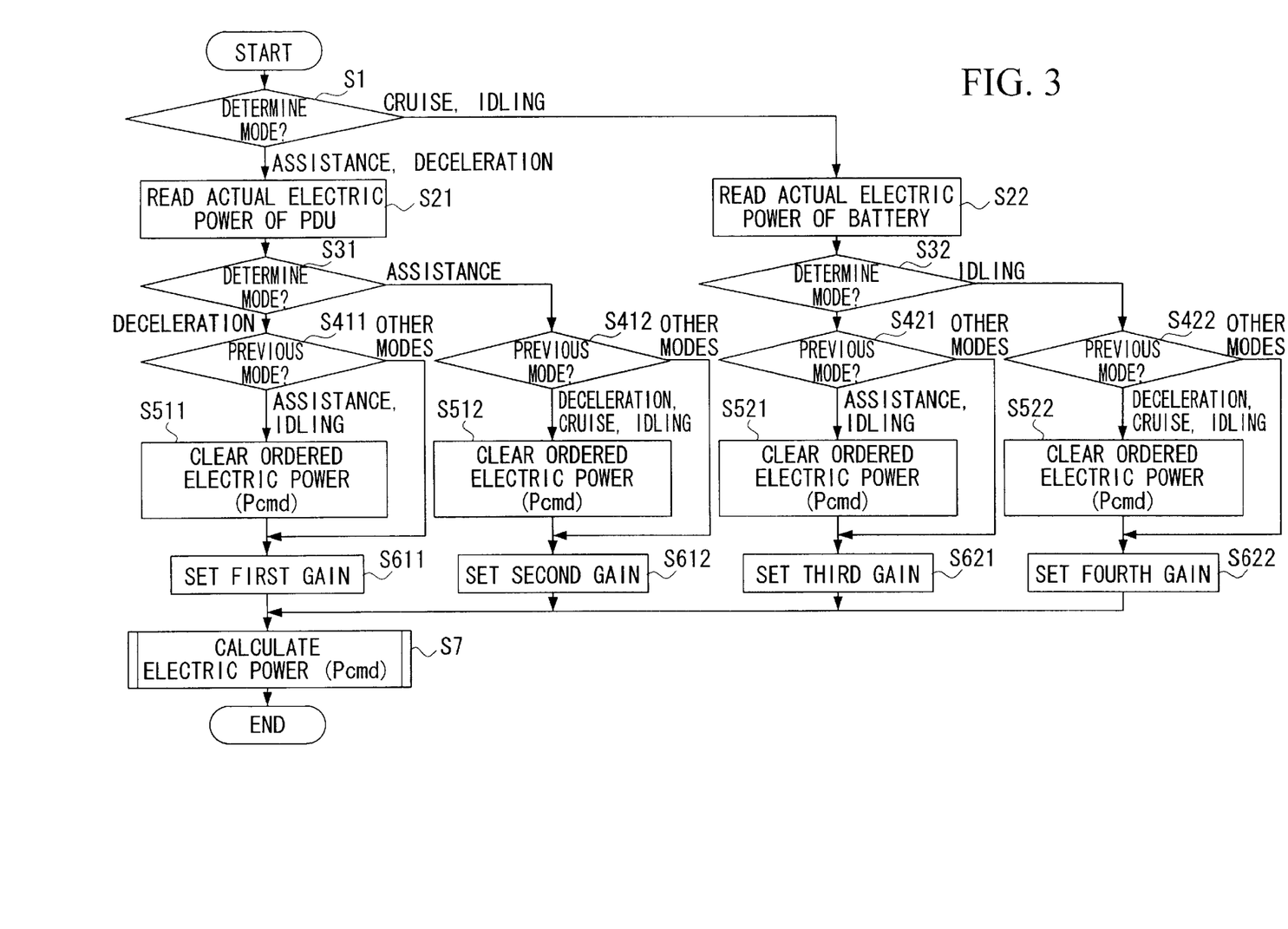
FIG. 3 is a flowchart showing the flow for setting a gain and calculating an ordered electric power according to the present invention.

The setting of the gain used by the feedback processor 15 and the calculation of the electric power Pcmd to be instructed and sent by the feedback processor 15 to the power drive unit 3 will be explained with reference to the flowchart of FIG. 3. The power drive unit 3 supplies or draws the ordered electric power to or from the motor 2 according to the ordered electric power Pcmd. Reference characters such as S1 denote steps in the flowchart.

In step S1, the drive mode determining device 11 determines the present drive mode, based on predetermined parameters. When in the assistance mode, or the deceleration mode, the flow proceeds to step S21. When in the cruise mode, or the idling mode, the flow proceeds to step S22.

In step S21, the measured electric power selector 16 selects the value measured by the second electric power measuring device 7, and sends the selected value to the feedback processor 15. Namely, when in the assistance mode, or the deceleration mode, the second electric power measuring device 7 in proximity of the terminal 3a of the power drive unit 3 is selected as an active electric power measuring device. Then, the flow proceeds to step S31.

In step S22, the measured electric power selector 16 selects the value measured by the first electric power measuring device 6, and sends the selected value to the feedback processor 15. Namely, when in the cruise mode, or the idling mode, the first electric power measuring device 6 in proximity of the terminal 1a of the main battery 1 is selected as an active electric power measuring device. Then, the flow proceeds to step S32.

In step S31, the drive mode determining device 11 again determines the present drive mode. When in the deceleration mode, the flow proceeds to step S411. When in the assistance mode, the flow proceeds to step S412.

In step S32, the drive mode determining device 11 determines the present drive mode. When in the cruise mode, the flow proceeds to step S421. When in the idling mode, the flow proceeds to step S422.

In step S411, the feedback processor 15 determines the previous drive mode. Namely, the drive mode storage device 12 sends the information regarding the previous drive mode, which has been stored in the drive mode storage device 12, to the feedback processor 15. The feedback processor 15 determines the previous drive mode, based on the sent information. If the determination shows that the previous drive mode was the assistance mode, or the idling mode, the flow proceeds to step S511. If not, the flow skips over step S511, and proceeds to step S611.

In step S511, the feedback processor 15 clears the ordered electric power Pcmd, that is, sets the ordered electric power Pcmd to the power drive unit 3 to zero. Then, the flow proceeds to step S611.

In step S611, the feedback processor 15 receives as an input the information regarding the gain from the gain switcher 14, and sets the gains, which are to be used in the feedback processor 15, to the first gains (Kp1 and Ki1), based on the input information. Namely, since in steps S1 and S31 the drive mode determining device 11 has determined that drive mode is the deceleration mode, the determination is sent to the gain switcher 14. The gain switcher 14 switches the gains to the first gains (Kp1 and Ki1) corresponding to the deceleration mode, depending on the determination of drive mode (the deceleration mode). The gain switcher 14 sends the switched gains to the feedback processor 15, and the feedback processor 15 sets the sent gains. Then, the flow proceeds to step S7.

In step S412, the feedback processor 15 determines the previous drive mode. Namely, the drive mode storage device 12 sends the information regarding the previous drive mode, which has been stored in the drive mode storage device 12, to the feedback processor 15, and the feedback processor 15 determines the previous drive mode, based on the sent information. If the determination shows that the previous drive mode was the deceleration mode, the cruise mode, or the idling mode, the flow proceeds to step S512. If not, the flow skips over step S512, and proceeds to step S612.

In step S512, the feedback processor 15 clears the ordered electric power Pcmd, that is, sets the ordered electric power Pcmd, which is to be instructed to the power drive unit 3, to zero. Then, the flow proceeds to step S612.

In step S612, the feedback processor 15 receives as an input the information regarding the gains from the gain switcher 14, and sets the gains, which are to be used in the feedback processor 15, to the second gains (Kp2 and Ki2), based on the input information. In this case, since in steps S1 and S31 the drive mode determining device 11 has determined that drive mode is the assistance mode, the result of the determination is sent to the gain switcher 14. The gain switcher 14 switches the gains to the second gains (Kp2 and Ki2) corresponding to the assistance mode, depending on the result of the determination of drive mode (the assistance mode). Further, the gain switcher 14 sends the switched gains to the feedback processor 15, and the feedback processor 15 sets the sent gains. Then, the flow proceeds to step S7.

In step S421, the feedback processor 15 determines the previous drive mode. Namely, the drive mode storage device 12 sends the information regarding the previous drive mode, which has been stored in the drive mode storage device 12, to the feedback processor 15. The feedback processor 15 determines the previous drive mode, based on the sent information. If the determination shows that the previous drive mode was the assistance mode or the idling mode, the flow proceeds to step S521. If not, the flow skips over step S521, and proceeds to step S621.

In step S521, the feedback processor 15 clears the ordered electric power Pcmd, that is, the ordered electric power, which is to be instructed to the power drive unit 3, to zero. Then, the flow proceeds to step S621.

In step S621, the feedback processor 15 receives as an input the information regarding the gains from the gain switcher 14, and sets the gains, which are to be used in the feedback processor 15, to third gains (Kp3 and Ki3). Namely, since in steps S1 and S32 the drive mode determining device 11 has determined that the drive mode is the cruise mode, the result of the determination of the drive mode (the cruise mode) is sent to the gain switcher 14. The gain switcher 14 switches the gains to the third gains (Kp3 and Kp3) corresponding to the cruise mode. Further, the gain switcher 14 sends the switched gains to the feedback processor 15, and the feedback processor 15 sets the sent gains. Then, the flow proceeds to step S7.

In step S422, the feedback processor 15 determines the previous drive mode. Namely, the drive mode storage device 12 sends the information regarding the previous drive mode, which has been stored in the drive mode storage device 12, to the feedback processor 15. The feedback processor 15 determines the previous drive mode, based on the sent information. As the result of the determination, when the previous drive mode was the deceleration mode, cruise mode, or idling mode, the flow proceeds to step S522. If not, the flow skips over step S522, and proceeds to step S622.

In step S522, the feedback processor 15 clears the ordered electric power Pcmd, that is, sets the electric power, which is to be instructed to the power drive unit 3, to zero. Then, the flow proceeds to step S622.

In step S622, the feedback processor 15 receives as an input the information regarding the gains from the gain switcher 14, and sets the gains, which are to be used in the feedback processor 15, to the fourth gains (Kp4 and Ki4), based on the input information. Namely, since in steps S1 and S32 the drive mode determining device 11 has determined that the drive mode is the idling mode, the result of the determination is sent to the gain switcher 14. The gain switcher 14 switches the gains to the fourth gains (Kp4 and Kp4) corresponding to the idling mode. Further, the gain switcher 14 sends the switched gains to the feedback processor 15, and the feedback processor 15 sets the sent gains. Then, the flow proceeds to step S7.

In step S7, the feedback processor 15 calculates the ordered electric power Pcmd to be sent to the power drive unit 3. The process of step S7 will be explained in detail below. The above is the flow of setting the gains and calculating the ordered electric power.

Figure 4:
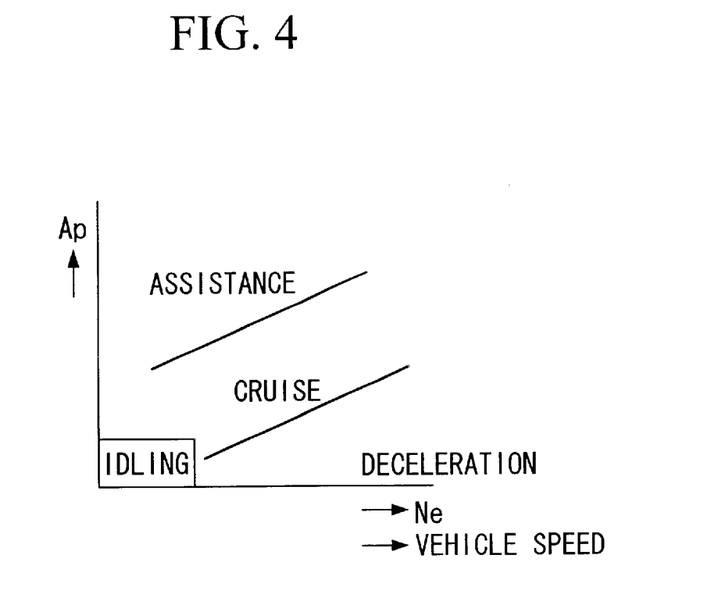
FIG. 4 is a diagram schematically showing a method for determining the drive mode according to the present invention.

FIG. 4 is a schematic diagram for explaining the determination of drive mode in steps S1, S31, and S32 in the above-described flow. The horizontal axis in this figure represents the engine speed Ne, or the vehicle speed, while the vertical axis represents the amount Ap of depression of the accelerator pedal.

The drive mode determining device 11 receives as an input the engine speed Ne, or the vehicle speed, and the amount Ap of depression of the accelerator pedal. When the engine speed Ne or the vehicle speed is low while the amount Ap of depression of the accelerator pedal is high, the drive mode determining device 11 determines that the drive mode is the assistance mode. When the engine speed Ne or the vehicle speed is high while the amount Ap of depression of the accelerator pedal is low, the drive mode determining device 11 determines that the drive mode is the deceleration mode. When these values are intermediate, the drive mode determining device 11 determines that drive mode is the cruise mode. When both the engine speed Ne or the vehicle speed, and the amount Ap of depression of the accelerator pedal are low, it is determined that the drive mode is the idling mode.

FIGS. 5A to 5F are diagrams, showing the transition of states, for explaining the operation to clear the ordered electric power Pcmd (set it to zero) in steps S511, S512, S521, and S522 when switching the drive mode. In the figures, the horizontal axes represent time, while the vertical axes represent the electric power supplied to the motor 2 or drawn from the motor 2. In the idling mode, the cruise mode, or the deceleration mode, the electric power is drawn from the motor 2. In the figures, in the areas above the dashed lines, the electric power is supplied to the motor 2, and the motor 2 is driven. In the areas below the dashed lines, the electric power is drawn from the motor 2, and the motor 2 acts as an generator.

Figure 5A:
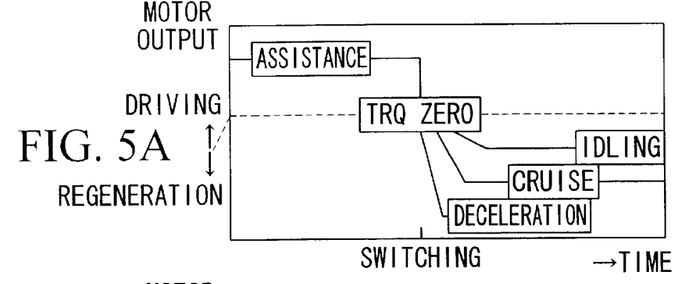
FIGS. 5A to 5F are diagrams for explaining the process for clearing the ordered electric power to zero when switching the drive mode according to the present invention.
Figure 5B:
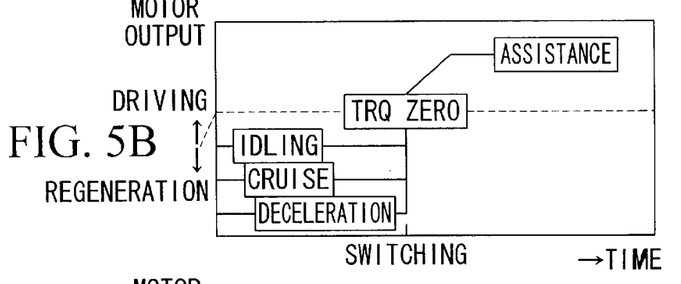

FIG. 5A shows the transition from assistance mode to another mode, which can be the idling mode, cruise mode, or deceleration mode. FIG. 5B shows the transition from the idling mode, cruise mode, or deceleration mode to the assistance mode. In the assistance mode, the motor 2 assists the engine 10, and the electric power is supplied to the motor 2. When the drive mode changes from the assistance mode to another mode, or when the drive mode changes from another mode to the assistance mode, the lines pass through the points at which the electric power to be supplied to the motor 2 is set to zero. To quicken the switching, the ordered electric power Pcmd is cleared to zero before the switching of the ordered electric power Pcmd.

Figure 5C:
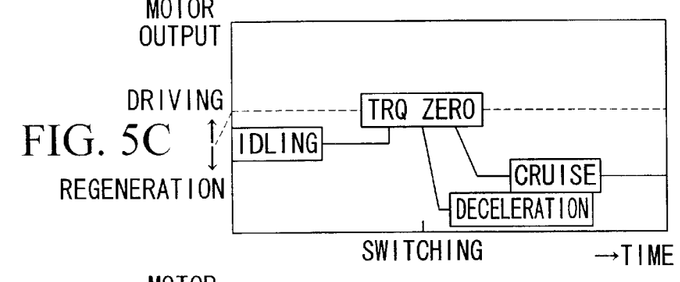
Figure 5D:
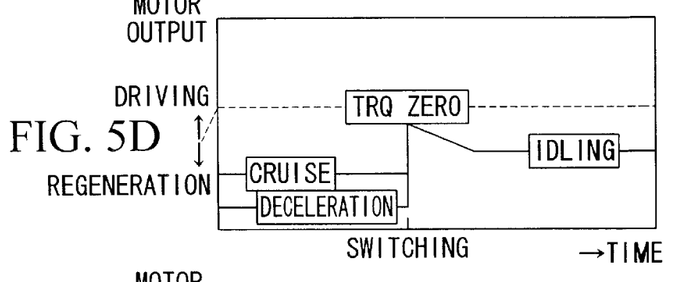

FIG. 5C shows the transition from the idling mode to another mode, which can be the cruise mode, or deceleration mode. FIG. 5D shows the transition from the cruise mode or the deceleration mode to the idling mode. In the idling mode, when the regeneration by the motor 2 (the electric power drawn from the motor 2) is increased, the load on the engine 10 is also increased, and the engine 10 may stall. Therefore, at the time of switching from or to the idling mode, even when the sign (plus or minus) of the ordered electric power Pcmd to be instructed to the motor 2 is not inverted, the ordered electric power Pcmd is cleared to zero. The inversion of the sign of the ordered electric power Pcmd means a change from the drawing of the electric power from the motor 2 to the supplying of the electric power to the motor 2.

Figure 5E:
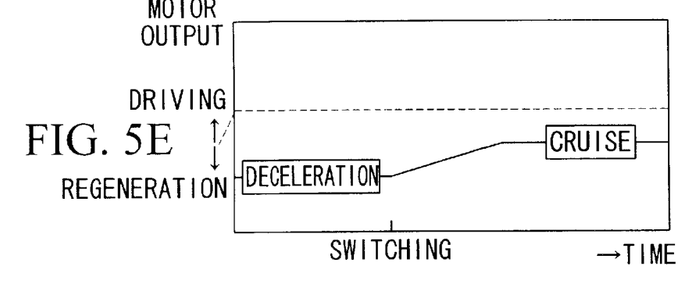
Figure 5F:
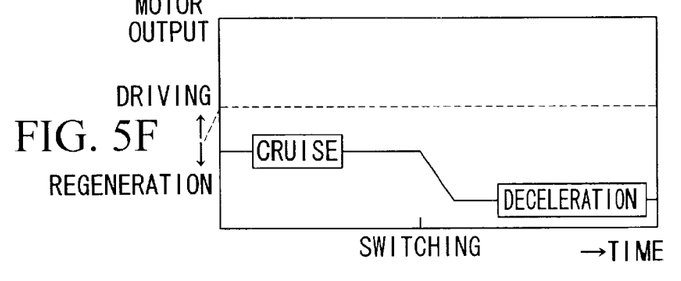

FIGS. 5E and 5F show the situations other than those of FIGS. 5A to 5D. FIG. 5E shows the transition from the deceleration mode to the cruise mode, and FIG. 5F shows the transition from the cruise mode to the deceleration mode. In these cases, the ordered electric power Pcmd is not cleared to zero because it is not necessary.

Figure 6:
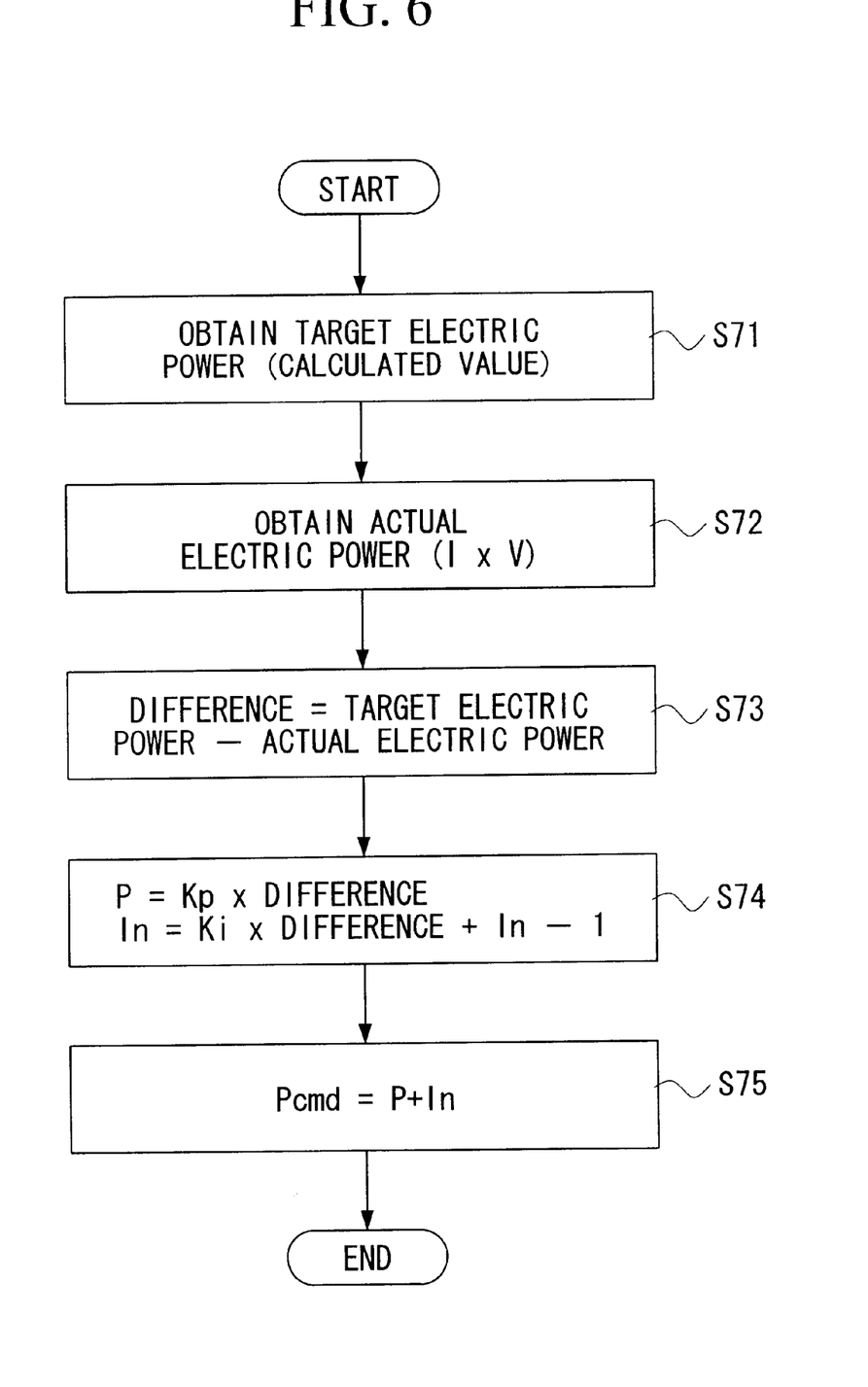
FIG. 6 is a flowchart showing in detail the flow for calculating the ordered electric power according to the present invention.

FIG. 6 is a flowchart showing the steps of calculating the ordered electric power Pcmd (step S7 in FIG. 3) in detail. In the description, reference characters such as S71 indicate steps in the flowchart.

In step S71, the target electric power calculator 13 outputs the target electric power. The feedback processor 15 receives as an input the output target electric power. At that time, the target electric power calculator 13 outputs the target electric power which is to be supplied to or drawn from the motor 2, when in the assistance mode or deceleration mode, or outputs the target electric power which is to be drawn from or supplied to the battery 1, when in the cruise mode or idling mode.

In step S72, the measured electric power selector 16 selects one of the measured values (actual electric power) sent from the first electric power measuring device 6 and the second electric power measuring device 7, and sends the selected value to the feedback processor 15. Namely, when in the cruise mode, or the idling mode, the value measured by the first electric power measuring device 6 is selected. When in the assistance mode, or the deceleration mode, the value measured by the second electric power measuring device 7 is selected.

In step S73, the feedback processor 15 calculates the difference between the sent measured value (actual electric power) and the target electric power, and stores the result as the difference.

In the next step S74, the feedback processor 15 multiplies the difference by the P gain Kp, stores this result as a value P, multiplies the difference by the I gain Ki, adds In−1 to this multiplication result, and stores this addition result as a value In. The value P is a proportional term, and the value In is an integrated value. The value In−1 is the previous integrated value.

In the last step S75, the feedback processor 15 adds up the values P and In, the added value is set as the electric power Pcmd to be ordered, and the electric power Pcmd is sent to the power drive unit 3.

In steps S74 and S75, the integration member In may not be used, and the ordered electric power Pcmd may be calculated only from the proportional member P.

Figure 7A:
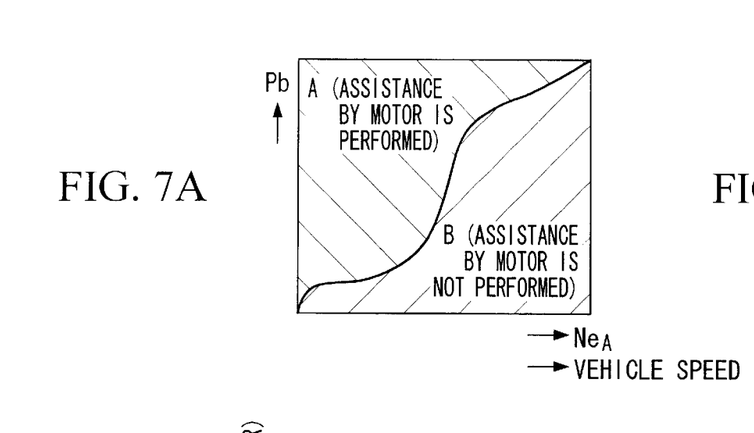
FIGS. 7A to 7D are diagrams for explaining the method for calculating the target electric power according to the present invention.
Figure 7B:
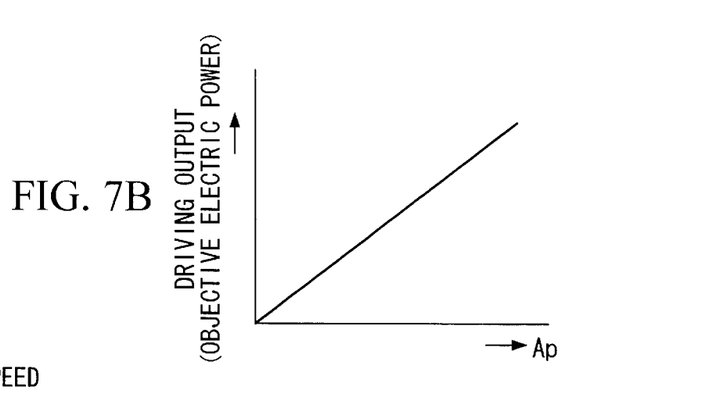
Figure 7C:
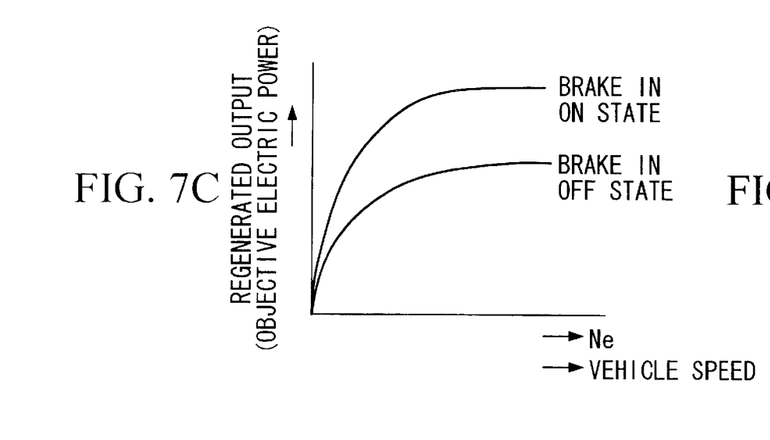
Figure 7D:
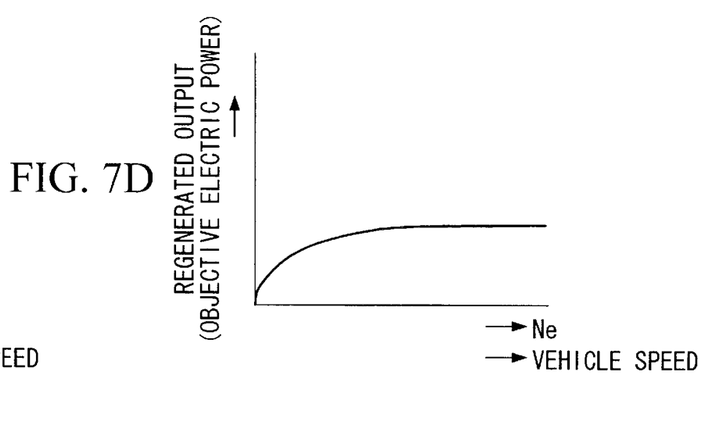

FIGS. 7A to 7D are diagrams for explaining the method for calculating the target electric power in step S71. FIGS. 7A and 7B show the method for calculating the target electric power in the assistance mode. FIG. 7C shows the method for calculating the target electric power in the deceleration mode. FIG. 7D shows the method for calculating the target electric power in the cruise mode.

In FIG. 7A, the horizontal axis represents the engine speed Ne, or the vehicle speed, and the vertical axis represents the air intake (negative) passage pressure Pb. In FIG. 7B, the horizontal axis represents the amount of depression of the accelerator pedal Ap, and the vertical axis represents the target electric power in the assistance mode. In FIG. 7C, the horizontal axis represents the engine speed Ne, or the vehicle speed, and the vertical axis represents the target electric power in the deceleration mode. In FIG. 7D, the horizontal axis represents the engine speed Ne, or the vehicle speed, and the vertical axis represents the target electric power in the cruise mode.

When in the assistance mode, as shown in FIG. 7A, the target electric power calculator 13 determines whether to perform assistance by the motor, based on the engine speed Ne, or the vehicle speed, and the air intake passage pressure Pb. When the engine speed Ne, or the vehicle speed, and the air intake passage pressure Pb are in the upper left area A in the figure, that is, when the engine speed Ne or the vehicle speed is low while the air intake passage pressure Pb is high, the motor assists the engine. Conversely, when the engine speed Ne or the vehicle speed, and the air intake passage pressure Pb are in the lower right area in the figure, that is, when the engine speed Ne or the vehicle speed is high while the air intake passage pressure Pb is low, the motor does not assist the engine.

According to the relationship indicated in FIG. 7B, the target electric power calculator 13 calculates the target electric power in the assistance mode, based on the amount Ap of depression of the accelerator pedal. Namely, as the amount Ap of depression of the accelerator pedal is increased, the target electric power is increased. The target electric power in this mode is the objective value of the electric power which is to be supplied to the motor 2, that is, the electric power for driving the motor 2.

When in the deceleration mode, according to the relationship shown in FIG. 7C, the target electric power calculator 13 calculates the target electric power, based on the engine speed Ne or the vehicle speed. Namely, as the engine speed Ne or the vehicle speed is increased, the target electric power is increased. The on/off state of the brake is also taken into consideration. When the brake is in the on state, the target electric power is higher than that in case that the brake is in the off state. The target electric power in this mode is an objective value of the electric power to be drawn from the motor 2, that is, the electric power to be regenerated.

When in the cruise mode, according to the relationship shown in FIG. 7D, the target electric power calculator 13 calculates the target electric power, based on the engine speed Ne or the vehicle speed. Namely, as the engine speed Ne or the vehicle speed is increased, the target electric power is increased. The target electric power in this mode is an objective value of the electric power to be drawn from the motor 2, that is, the electric power to be regenerated.

Figure 8:
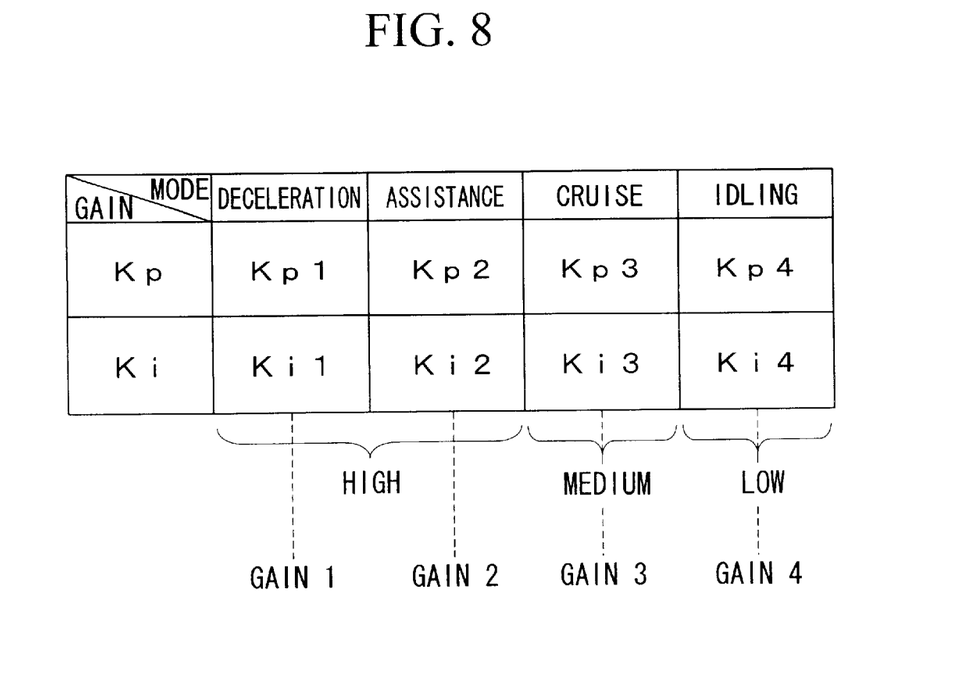
FIG. 8 is a table for explaining the relationship between the drive modes and the gains according to the present invention.

FIG. 8 is a table showing the relationship of the gains to be set in the respective drive modes, that is, the P gains Kp and the I gains Ki. The gains are set in steps S611, S612, S621, and S622 in FIG. 3. The unequal relationship of the gains, which are shown in FIG. 8, is represented by Kp1>Kp2>Kp3>Kp4, and Ki1>Ki2>Ki3>Ki4.

While the above embodiment has the selector for selecting the point at which the electric power is measured, depending on the drive mode, and the gain switcher for switching the gains in the feedback system for controlling the motor, depending on the drive mode, the present invention is not limited to this embodiment, and at least one of the selector and the switcher may be provided.

Even when the gain switcher 14 is not provided while the first electric power measuring device 6 for measuring the electric power supplied to and drawn from the main battery 1, the second electric power measuring device 7 for measuring the electric power supplied to and drawn from the motor 2, and the measured electric power selector 16 for selecting one of the measured values are provided, the point at which the electric power is measured is changed, depending on the drive mode. Therefore, the following effects can be achieved: when in the assistance mode or in the deceleration mode, the electric power supplied to or drawn from the motor 2 is controlled so that the vehicle can respond to the driver's instructions to accelerate or decelerate the vehicle; and when in the idling mode or the cruise mode, the electric power supplied to or drawn from the main battery 1 is controlled so as to balance the energy management.

Conversely, even when the first electric power measuring device 6, the second electric power measuring device 7, and the measured electric power selector 16 are not provided while the gain switcher 14 for switching the gains, and a single electric power measuring device are provided, the gain for the feedback system for controlling the motor is changed, depending on the drive mode. Therefore, the following effects can be achieved: when in the assistance mode or in the deceleration mode, the gain is increased so that the vehicle can respond to the driver's instructions to accelerate or decelerate the vehicle; when in the idling mode, the gain is reduced so that the variation in the load on the engine 10 caused by the motor 2 is reduced, thereby preventing the engine from stalling when the equipment 5 is turned on or off, and when in the cruise mode, the gain is reduced so that the variation in the load on the engine 10 caused by the motor 2 is reduced, thereby preventing the unstable behavior of the vehicle when the equipment 5 is turned on or off.

According the first aspect of the present invention, the motor control apparatus is responsive to the driver's instructions to accelerate or decelerate the vehicle, while balancing the energy management when the vehicle is idling or cruising.

According the second aspect of the present invention, the motor control apparatus is responsive to the driver's instructions to accelerate or decelerate the vehicle, while preventing the engine from stalling in the idling mode when electrical equipment is turned on or off, and while preventing unstable behavior of the vehicle in the cruise mode when the electrical equipment is turned on or off.

According the third aspect of the present invention, the motor control apparatus is responsive to the driver's instructions to accelerate or decelerate the vehicle, while balancing the energy management when the vehicle is idling or cruising, while preventing the engine from stalling in the idling mode when electrical equipment is turned on or off, and while preventing unstable behavior of the vehicle in the cruise mode when the electrical equipment is turned on or off.

According to the fourth aspect of the present invention, when in the cruise mode or the idling mode, the value measured by the first electric power measuring device is selected, the electric power stored in the battery is measured, and the control is performed based on the selected value, thereby balancing the energy management.

When in the assistance mode or the deceleration mode, the value measured by the second electric power measuring device is selected, the electric power supplied to or drawn from the motor is measured, and the control is performed based on the selected value, thereby making the vehicle responsive to the driver's instructions to accelerate or decelerate the vehicle.

According to the fifth aspect of the present invention, the gain switched by the gain switcher in the cruise mode or the idling mode is smaller than the gain in the assistance mode or the deceleration mode. Therefore, when in the cruise mode or the idling mode, even when electrical equipment is turned on or off, the rate of change in the motor torque which is defined by the gain is low, and variations in the load on the engine are also low. Accordingly, when in the idling mode, the engine can be prevented from stalling, and when in the cruise mode, unstable behavior of the vehicle can be prevented.

When in the assistance mode or the deceleration mode, because the rate of change in the motor torque defined by the gain is high, the vehicle can be responsive to the driver's instructions to accelerate or decelerate the vehicle.

This invention may be embodied in other forms or carried out in other ways without departing from the spirit thereof. The present embodiments are therefore to be considered in all respects illustrative and not limiting, the scope of the invention being indicated by the appended claims, and all modifications falling within the meaning and range of equivalency are intended to be embraced therein.

What is claimed is:

1. A motor control apparatus for a hybrid vehicle with a combustion engine for outputting a driving force, an electric motor for generating a force for assisting the output from the engine, a power storage unit for supplying electric power to the motor and for storing electric energy regenerated by the motor, and electrical equipment which is operated by the electric power, the motor control apparatus comprising:
    a first electric power measuring device for measuring the electric power supplied from or stored in the power storage unit;
    a second electric power measuring device for measuring the electric power supplied to or drawn from the motor;
    a drive mode determining device for determining a drive mode, based on a predetermined parameter;
    a measured electric power selector for selecting one of the value measured by the first electric power measuring device and the value measured by the second electric power measuring device, depending on the determination by the drive mode determining device; and
    a motor controller for controlling the electric power which is to be supplied to or is to be drawn from the motor, depending on the measured value selected by the measured electric power selector.

2. A motor control apparatus according to claim 1, wherein the drive mode determining device determines one of an assistance mode for accelerating the vehicle, a deceleration mode for decelerating the vehicle, a cruise mode for driving the vehicle at a constant speed, and an idling mode for idling the vehicle, and
    the measured electric power selector selects the value measured by the first electric power measuring device when in the cruise mode or the idling mode, and selects the value measured by the second electric power measuring device when in the assistance mode or the deceleration mode.

3. A motor control apparatus for a hybrid vehicle with a combustion engine for outputting a driving force, an electric motor for generating a force for assisting the output from the engine, a power storage unit for supplying electric power to the motor and for storing electric energy regenerated by the motor, and electrical equipment which is operated by the electric power, the motor control apparatus comprising:
    an electric power measuring device for measuring the electric power transferred between the power storage unit and the motor;
    a motor controller for controlling the electric power which is to be supplied to the motor or which is to be drawn from the motor, depending on the value measured by the electric power measuring device;
    a drive mode determining device for determining a drive mode, based on a predetermined parameter; and
    a gain switcher for switching a gain which defines a rate of change in the torque of the motor, depending on the determination by the drive mode determining device wherein
    the motor controller controls the electric power which is to be supplied to or is to be drawn from the motor, depending on the rate of change defined by the gain switched by the gain switcher.

4. A motor control apparatus according to claim 3, wherein the drive mode determining device determines one of an assistance mode for accelerating the vehicle, a deceleration mode for decelerating the vehicle, a cruise mode for driving the vehicle at a constant speed, and an idling mode for idling the vehicle, and
    the gain switched by the gain switcher in the cruise mode or the idling mode is smaller than the gain in the assistance mode or the deceleration mode.

5. A motor control apparatus for a hybrid vehicle with a combustion engine for outputting a driving force, an electric motor for generating a force for assisting the output from the engine, a power storage unit for supplying electric power to the motor and for storing electric energy regenerated by the motor, and an electrical equipment which is operated by the electric power, the motor control apparatus comprising:
    a first electric power measuring device for measuring the electric power supplied from or stored in the power storage unit;
    a second electric power measuring device for measuring the electric power supplied to or drawn from the motor;
    a drive mode determining device for determining a drive mode, based on a predetermined parameter;
    a measured electric power selector for selecting one of the value measured by the first electric power measuring device and the value measured by the second electric power measuring device, depending on the determination by the drive mode determining device;
    a motor controller for controlling the electric power supplied to or drawn from the motor, depending on the measured value selected by the measured electric power selector; and a gain switcher for switching a gain which defines a rate of change in the torque of the motor, depending on the determination by the drive mode determining device, wherein the motor controller controls the electric power which is to be supplied to or is to be drawn from the motor, depending on the rate of change defined by the gain switched by the gain switcher.

6. A motor control apparatus according to claim 5, wherein the drive mode determining device determines one of an assistance mode for accelerating the vehicle, a deceleration mode for decelerating the vehicle, a cruise mode for driving the vehicle at a constant speed, and an idling mode for idling the vehicle, and the measured electric power selector selects the value measured by the first electric power measuring device when in the cruise mode or the idling mode, and selects the value measured by the second electric power measuring device when in the assistance mode or the deceleration mode.

7. A motor control apparatus according to claim 5, wherein the drive mode determining device determines one of an assistance mode for accelerating the vehicle, a deceleration mode for decelerating the vehicle, a cruise mode for driving the vehicle at a constant speed, and an idling mode for idling the vehicle, and the gain switched by the gain switcher in the cruise mode or the idling mode is smaller than the gain in the assistance mode or the deceleration mode.

\* \* \* \* \*